(12) United States Patent
Tanaka et al.

(10) Patent No.: US 7,396,606 B2
(45) Date of Patent: Jul. 8, 2008

(54) FUEL-CELL EVALUATION EQUIPMENT

(75) Inventors: Hideki Tanaka, Kobe (JP); Kimio Yoshizumi, Tanba (JP); Hitoshi Ando, Kobe (JP); Akira Mizugaki, Kobe (JP); Hiroshi Okuda, Nagaokakyo (JP); Akira Ueda, Kobe (JP)

(73) Assignee: Espec Corp., Osaka (JP)

( * ) Notice: Subject to any disclaimer, the term of this patent is extended or adjusted under 35 U.S.C. 154(b) by 211 days.

(21) Appl. No.: 11/257,538

(22) Filed: Oct. 25, 2005

(65) Prior Publication Data

US 2006/0093881 A1   May 4, 2006

(30) Foreign Application Priority Data

Oct. 29, 2004   (JP)   ............................. 2004-316875

(51) Int. Cl.
  *H01M 8/04*   (2006.01)
  *H01M 2/00*   (2006.01)
(52) U.S. Cl. .............................. 429/24; 429/26; 429/34
(58) Field of Classification Search .................. 429/24, 429/26, 32, 34; 73/117.1, 571, 865.6; 702/63; 236/34, 137, 165
  See application file for complete search history.

(56) References Cited

U.S. PATENT DOCUMENTS

| | | | | |
|---|---|---|---|---|
| 6,106,964 A | * | 8/2000 | Voss et al. | .................... 429/20 |
| 6,383,671 B1 | * | 5/2002 | Andrews et al. | .............. 429/24 |
| 2002/0015867 A1 | * | 2/2002 | Cargnelli et al. | .............. 429/13 |
| 2003/0162063 A1 | * | 8/2003 | Yoshizawa et al. | ............ 429/24 |
| 2003/0235725 A1 | * | 12/2003 | Haltiner et al. | ............... 429/19 |
| 2006/0120703 A1 | * | 6/2006 | Tanaka et al. | ............... 392/465 |

FOREIGN PATENT DOCUMENTS

| | | | |
|---|---|---|---|
| JP | 2004-273222 | * | 9/2004 |
| JP | 2004-303443 | * | 10/2004 |

* cited by examiner

*Primary Examiner*—Stephen J. Kalafut
*Assistant Examiner*—Lynn C Duncan
(74) *Attorney, Agent, or Firm*—Wood, Phillips, Katz, Clark & Mortimer

(57) ABSTRACT

A fuel-cell evaluation equipment includes a gas passageway for supplying gas to a fuel cell and a thermostat adapted to accommodate the fuel cell, wherein the gas passageway includes a first temperature regulator adapted to regulate the temperature of gas and a humidity regulator adapted to regulate the humidity of the gas. A thermostatic chamber of the thermostat regulates an inner temperature in the chamber according to a test condition. The thermostatic chamber is provided with a second temperature regulator into which gas flowing in the gas passageway flows. The gas flowing in the gas passageway is supplied to the fuel cell after heat exchange by the second temperature regulator.

22 Claims, 2 Drawing Sheets

FUEL-CELL EVALUATION EQUIPMENT

BACKGROUND OF THE INVENTION

1. Field of the Invention

The present invention relates to a fuel-cell evaluation equipment, and more particularly to a fuel-cell evaluation equipment adapted to control conditions of gas to be supplied to the fuel cell.

2. Description of the Related Art

Recently, in order to develop a fuel cell applicable for use as a power source for devices such as cars with sharp load fluctuations or severe temperature fluctuations in use environment, it is desired to provide a fuel-cell evaluation equipment that is able to control conditions such as flow rate, temperature, and humidity of gas to be supplied to the fuel cell more largely and accurately.

Thus, to achieve the object, test equipment provided with a gas supply unit for evaluation tests as disclosed in JP 2004-273222A has been employed on a performance test for a fuel cell in the related art. The gas supply unit for an evaluation test disclosed in JP 2004-273222A heats or humidifies gas by means of so-called bubbling, whereby the gas is immersed in the water stored in a predetermined reservoir, a gas consisting mainly of hydrogen or oxygen that is used as active materials, thereby enabling to control temperature or humidity of gas to be supplied to a fuel cell.

According to the evaluation equipment of this structure, the evaluation test for a fuel cell is performed under various modifications of conditions such as an output condition or an operating atmospheric temperature.

However, the foregoing conventional fuel-cell evaluation equipment has such a problem that considerable changes of control range of parameter, which is a test condition for a fuel cell, renders the conditions such as the temperature of gas to be supplied to the fuel cell unstable and results in lowering the accuracy of the evaluation test.

Further, to make gas supply to a fuel cell be wildly changed, it is necessary to make a duct diameter for gas supply large so as to be able to supply a high flow of gas. In this structure, if and when the evaluation test is carried out with extremely small gas supply to a fuel cell, the gas remains in the duct for gas supply for long periods of time, resulting in a problem that large divergence of the temperature of gas supply from that of the testing conditions.

Still further, when a heater for heating gas employs one capable of heating a high flow rate of gas, the temperature of supplied gas with extremely small gas supply to a fuel cell is not well controlled, resulting in a problem that the accuracy of the evaluation test is lowered.

SUMMARY OF THE INVENTION

In view of the problems in the related art described above, an object of the present invention is to provide a fuel-cell evaluation equipment adapted to supply gas at a desired temperature to a fuel cell even though the condition of gas supply to the fuel cell is widely changed.

In order to solve the foregoing problems, therefore, an aspect of the present invention provided herein is a fuel-cell evaluation equipment including a gas passageway for supplying gas to a fuel cell and a thermostat adapted to accommodate at least a part of the fuel cell, wherein the gas passageway includes a first temperature regulator adapted to regulate the temperature of the gas, a humidity regulator adapted to regulate the humidity of the gas, and a second temperature regulator, and wherein the thermostat includes a thermostatic chamber adapted to regulate the atmospheric temperature in the chamber into a predetermined condition, the second temperature regulator being provided with a heat exchanger located in the thermostatic chamber.

The fuel-cell evaluation equipment in the present aspect enables an evaluation of a fuel cell at atmospheric temperature within the thermostatic chamber accommodating the fuel cell therein regulated into a predetermined test condition.

According to the fuel-cell evaluation equipment in the present aspect, gas regulated into a predetermined temperature and humidity by the first temperature regulator and the humidity regulator disposed at the gas passageway is introduced into the heat exchanger located in the thermostatic chamber so as to exchange heat within the thermostatic chamber, whereupon the gas is supplied to a fuel cell. When the gas supply to the fuel cell is large in quantity, the gas that has reached the heat exchanger in the thermostatic chamber is supplied to the fuel cell with maintaining its temperature regulated outside of the thermostatic chamber because of a rapid current of the gas flowing in the gas passageway.

On the other hand, when the gas supply to the fuel cell is small in quantity, the gas may fall in temperature on some level at the point of reaching the heat exchanger because of a slow current of the gas flowing in the gas passageway. However, in that case, the gas remains in the heat exchanger in the thermostatic chamber for longer periods of time, so as to be supplied to the fuel cell after sufficient heat exchange in the thermostatic chamber. Therefore, the fuel-cell evaluation equipment in the present aspect supplies gas regulated into a predetermined temperature to a fuel cell, even though gas supply to the fuel cell is small in quantity. Consequently, according to the present aspect, gas at a suitable temperature for an evaluation of a fuel cell is supplied to the fuel cell, regardless of the amount of gas supply to the fuel cell.

Another aspect of the present invention provided herein is a fuel-cell evaluation equipment including a gas passageway for supplying gas to a fuel cell and a thermostat adapted to accommodate at least a part of the fuel cell, wherein the gas passageway includes a first temperature regulator adapted to regulate the temperature of the gas, a humidity regulator adapted to regulate the humidity of the gas, and a second temperature regulator, the first temperature regulator being provided with a heater (heater of the first temperature regulator) adapted to heat gas and a cooler adapted to cool gas, and wherein the thermostat includes a thermostatic chamber adapted to regulate the atmospheric temperature in the chamber into a predetermined condition, the second temperature regulator being provided with a heat exchanger located in the thermostatic chamber.

Having the cooler adapted to cool gas, the fuel-cell evaluation equipment in the present aspect performs an evaluation of a fuel cell under low temperature condition.

Further, the fuel-cell evaluation equipment in the present aspect performs an evaluation of a fuel cell at atmospheric temperature within a thermostatic chamber accommodating a fuel cell regulated into a predetermined test condition. Still further, according to the present aspect, an evaluation of a fuel cell is carried out by supplying gas at a suitable temperature for the evaluation, regardless of the amount of gas supply to the fuel cell.

Still another aspect of the present invention provided herein is a fuel-cell evaluation equipment including a gas passageway for supplying gas to a fuel cell and a thermostat adapted to accommodate at least a part of the fuel cell, wherein the gas passageway includes a first temperature regulator adapted to regulate the temperature of the gas, a humidity regulator adapted to regulate the humidity of the gas, and a second temperature regulator, and wherein the thermostat includes a thermostatic chamber adapted to regulate the atmospheric temperature within the chamber into a predetermined condition, and wherein the second temperature regulator is provided with a heat exchanger and a heater (heater of the second temperature regulator) at least the heat exchanger being located in the thermostatic chamber, the heater of the second temperature regulator being deactivated when the following conditions are satisfied: (a) that a gas-flowing temperature of gas flowing into the second temperature regulator is lower than a preset temperature determined according to a test condition of a fuel cell, (b) that the difference between the gas-flowing temperature and the preset temperature is within a range capable of heating the gas to the preset temperature by heat exchange at the heat exchanger in the second temperature regulator in the thermostatic chamber, and (c) that gas flow into the second temperature regulator is less than a predetermined amount.

In this structure, the heater of the second temperature regulator is activated under optimal condition for regulating the temperature of the gas.

The fuel-cell evaluation equipment in the present aspect also regulates the temperature within the thermostatic chamber into a predetermined test condition because a part or a whole of a fuel cell is accommodated in the thermostatic chamber. Further, according to the fuel-cell evaluation equipment in the present aspect, gas supplied to a fuel cell is supplied at a suitable temperature for the evaluation, regardless of the amount of gas supply to the fuel cell. Consequently, the fuel-cell evaluation equipment in the present aspect performs an evaluation with a high degree of accuracy.

The fuel-cell evaluation equipment in these aspects may have such a structure that the gas passageway further includes a first passageway for guiding low-humidity gas and a second passageway for guiding gas with higher humidity than that of the gas flowing in the first passageway, the first and second passageways merging at a merging point, that the gas passageway is adapted to be connected to the fuel cell at downstream of the merging point in a direction of gas flowing, and that the humidity regulator is adapted to regulate the humidity of gas to be supplied to the fuel cell by adjusting a flow ratio of gas flowing in the first passageway to gas flowing in the second passageway.

In this structure, gas regulated into a suitable humidity for an evaluation of a fuel cell is supplied to the fuel cell.

The fuel-cell evaluation equipment in these aspects may have such a structure that the first temperature regulator is provided with a cooler adapted to cool gas to be supplied to a fuel cell.

In this structure, the equipment has the cooler adapted to cool gas, thereby carrying out an evaluation of a fuel cell under low temperature condition.

As described above, the inventors experimentally produced a fuel-cell evaluation equipment provided with a cooler and carried out experiments to provide a fuel-cell evaluation equipment capable of evaluating even under low temperature atmosphere. They found in consequence that gas cooled by the cooler was liable to rapidly rise in temperature before arriving at a fuel cell disposed in the thermostat in a structure having the cooler located far from a thermostat, and that this happened especially in the case of the small amount of gas flow.

Taking into account such a possible problem, the above-mentioned fuel-cell evaluation equipment may have such a structure that the first temperature regulator is provided with a cooler adapted to cool gas to be supplied to a fuel cell, the cooler being located just before the thermostat in a direction of gas flowing.

In this structure, low-temperature gas cooled by the cooler is supplied to a fuel cell disposed in a thermostat substantially without being warmed. Consequently, according to the present aspect, an evaluation of a fuel cell can be carried out under low temperature condition with a high degree of accuracy.

Further, the above-mentioned fuel-cell evaluation equipment in the present invention may have such a structure that the first temperature regulator is provided with a cooler adapted to cool gas to be supplied to a fuel cell, the cooler being located downstream of the humidity regulator in a direction of gas flowing, wherein the gas passageway further includes a cooling passageway for passing the gas therethrough to the cooler and a bypass passageway for bypassing the cooling passageway, and further including a passageway switch at the boundary between the cooling passageway and the bypass passageway, the passageway switch becoming unswitchable to the cooling passageway when the cooler operates in a state capable of cooling gas flowing in the upstream of the passageway switch to a lower temperature than a dew-point temperature of the gas.

This structure protects a cooler and the like from malfunction or failure resulting from condensation of water contained in gas.

Still further, the above-mentioned fuel-cell evaluation equipment may have such a structure that the second temperature regulator is provided with a heater (heater of the second temperature regulator) adapted to heat gas, the heater of the second temperature regulator being deactivated when the following conditions are satisfied: (a) that a gas-flowing temperature of gas flowing into the second temperature regulator is lower than a preset temperature determined according to a test condition of a fuel cell, (b) that the difference between the gas-flowing temperature and the preset temperature is within a range capable of heating the gas to the preset temperature by heat exchange at the heat exchanger in the second temperature regulator in the thermostatic chamber, and (c) that gas flow into the second temperature regulator is less than a predetermined amount.

In this structure, the heater of the second temperature regulator is activated under optimal condition for regulating gas into a predetermined temperature in response to gas stream temperature or gas flow rate.

Yet further, the above-mentioned fuel-cell evaluation equipment may have such a structure that the gas passageway further includes a first passageway for guiding low-humidity gas and a second passageway for guiding gas with higher humidity than that of the gas flowing in the first passageway, the first and second passageways merging at a merging point, wherein the first temperature regulator is provided with a heater (heater of the first temperature regulator) adapted to heat gas to be supplied to a fuel cell, wherein the gas passageway is adapted to be connected to the fuel cell at downstream of the merging point in a direction of gas flowing, and wherein the heater of the first temperature regulator is located on the first passageway.

In this structure, it is possible to rise the temperature of gas flowing in the first passageway up to and over a dew-point temperature of gas flowing in the second passageway. Thus, according to the structure, a mixture of low-humidity gas and high-humidity gas prevents the formation of dew condensation.

DESCRIPTION OF THE PREFERRED EMBODIMENT

Figure 1:
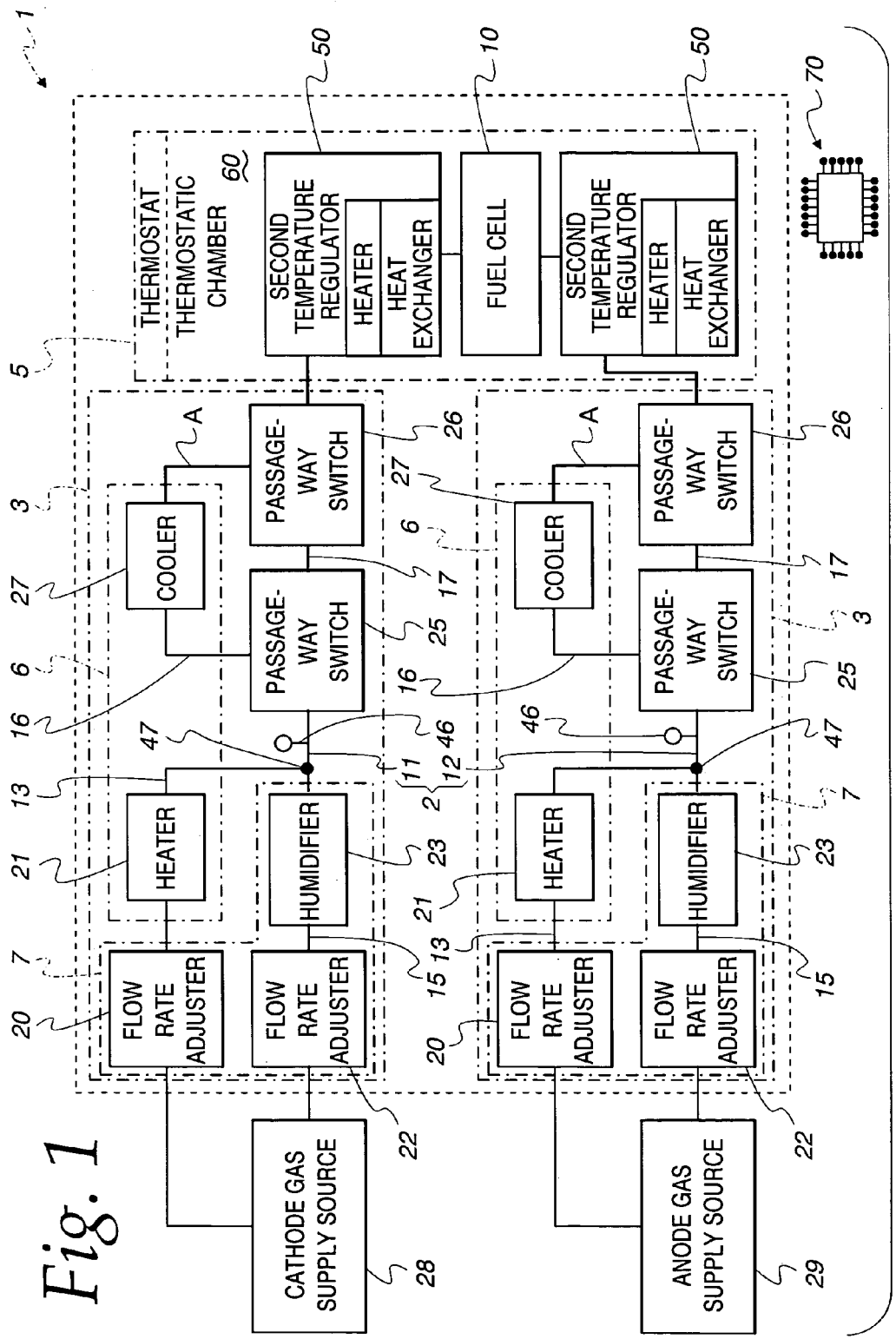
FIG. 1 is a figure of an operating principle of a fuel-cell evaluation equipment that is an embodiment of the present invention.

Now, an embodiment of the present invention will be described below in detail, making reference to the accompanying drawings. Referring to FIG. 1, the reference numeral 1 denotes a fuel-cell evaluation equipment (hereinafter referred to as a FC evaluation equipment 1) in the embodiment. The FC evaluation equipment 1 controls supply conditions such as temperature or humidity of gas to be introduced into the cathode of a fuel cell 10 (hereinafter referred to as cathode gas if needed) or gas to be introduced into the anode thereof (hereinafter referred to as anode gas if needed), and evaluates the performance of the fuel cell 10 with the environment condition of installation of the fuel cell 10 controlled.

The FC evaluation equipment 1, as shown in FIG. 1, consists mainly of a gas passageway 2 for supplying materials such as hydrogen used as an anode active material of the fuel cell 10 or oxygen used as a cathode active material thereof, regulators 3 and 3 each for regulating gas such as the hydrogen or the oxygen passing through the gas passageway 2 into a predetermined temperature or humidity (dew-point), and a thermostat 5 for accommodating the fuel cell 10 to be evaluated.

The gas passageway 2 is a passageway for connecting a supply source of gas such as hydrogen or oxygen to the fuel cell 10 accommodated in the thermostat 5. The gas passageway 2 is constituted by two systems consisting of a cathode gas passageway 11 connected to the cathode (oxygen electrode) of the fuel cell 10 and an anode gas passageway 12 connected to the anode (fuel electrode). The cathode gas passageway 11 and the anode gas passageway 12 are gas flowing ducts for the cathode gas and the anode gas, respectively.

The cathode and anode gas passageways 11 and 12 each have a form of an independent passageway, but their components are substantially the same. More specifically, the cathode and anode gas passageways 11 and 12 each have the regulator 3. Each of the gas passageways 11 and 12 has a passageway switch 25 disposed at the upstream of a cooler 27 described below in a direction of gas flow, and diverges to two systems consisting of a first passageway (also called "low-humidity passageway") 13 for guiding low-humidity gas and a second passageway (also called "high-humidity passageway") 15 for guiding high-humidity gas (i.e., gas with higher humidity than that of the gas flowing in the first passageway 13) at the further upstream of the passageway switch 25. The first and second passageways 13 and 15 merge at the upstream of the passageway switch 25. Each of the gas passageways 11 and 12 further has a cooling passageway 16 at the downstream of the passageway switch 25, the cooling passageway 16 being a passageway for passing the gas flowing in the gas passageway 11 or 12 therethrough to the cooler 27.

Each of the regulators 3 and 3 includes flow rate adjusters 20 and 22, a heater 21, a humidifier 23, the passageway switch 25, another passageway switch 26, and the cooler 27. The flow rate adjuster 20 and the heater 21 are disposed on the first passageway 13, whereas the flow rate adjuster 22 and the humidifier 23 are disposed on the second passageway 15. The passageway switches 25 and 26 are disposed at the boundary between the cooling passageway 16 and a bypass passageway 17 for bypassing the cooling passageway 16. The cooler 27 is disposed on the cooling passageway 16.

More specifically, the first and second passageways 13 and 15 are connected to either a cathode gas supply source 28 or an anode gas supply source 29 (hereinafter referred to as supply sources 28, 29 if needed) being at the outside of the FC evaluation equipment 1. The flow rate adjusters 20 and 22 respectively determine the flow rate of gas supplied to the first and second passageways 13 and 15.

The heater 21 and the cooler 27 function as a first temperature regulator 6 for regulating the temperature of gas flowing in the cathode or anode gas passageway 11 or 12. The flow rate adjusters 20 and 22 and the humidifier 23 function as a humidity regulator 7 for regulating the humidity (dew point) of gas flowing in the cathode or anode gas passageway 11 or 12. More specifically, in each of the cathode and anode gas passageways 11 and 12, the humidity regulator 7 regulates the humidity of gas supplied to the fuel cell 10 by adjusting a mixing ratio of low-humidity gas flowing in the first passageway 13 and high-humidity gas flowing in the second passageway 15 by means of the flow rate adjusters 20 and 22 and also regulating the humidity of gas flowing in the second passageway 15 by means of the humidifier 23.

Referring to FIG. 1, the first and second passageways 13 and 15 merge at the downstream of the heater 21 and the humidifier 23. Thereby, the flow rate adjusters 20 and 22 adjust a mixing ratio of high- and low-humidity gas, so as to supply gas at a desired humidity to the fuel cell 10.

Figure 2:
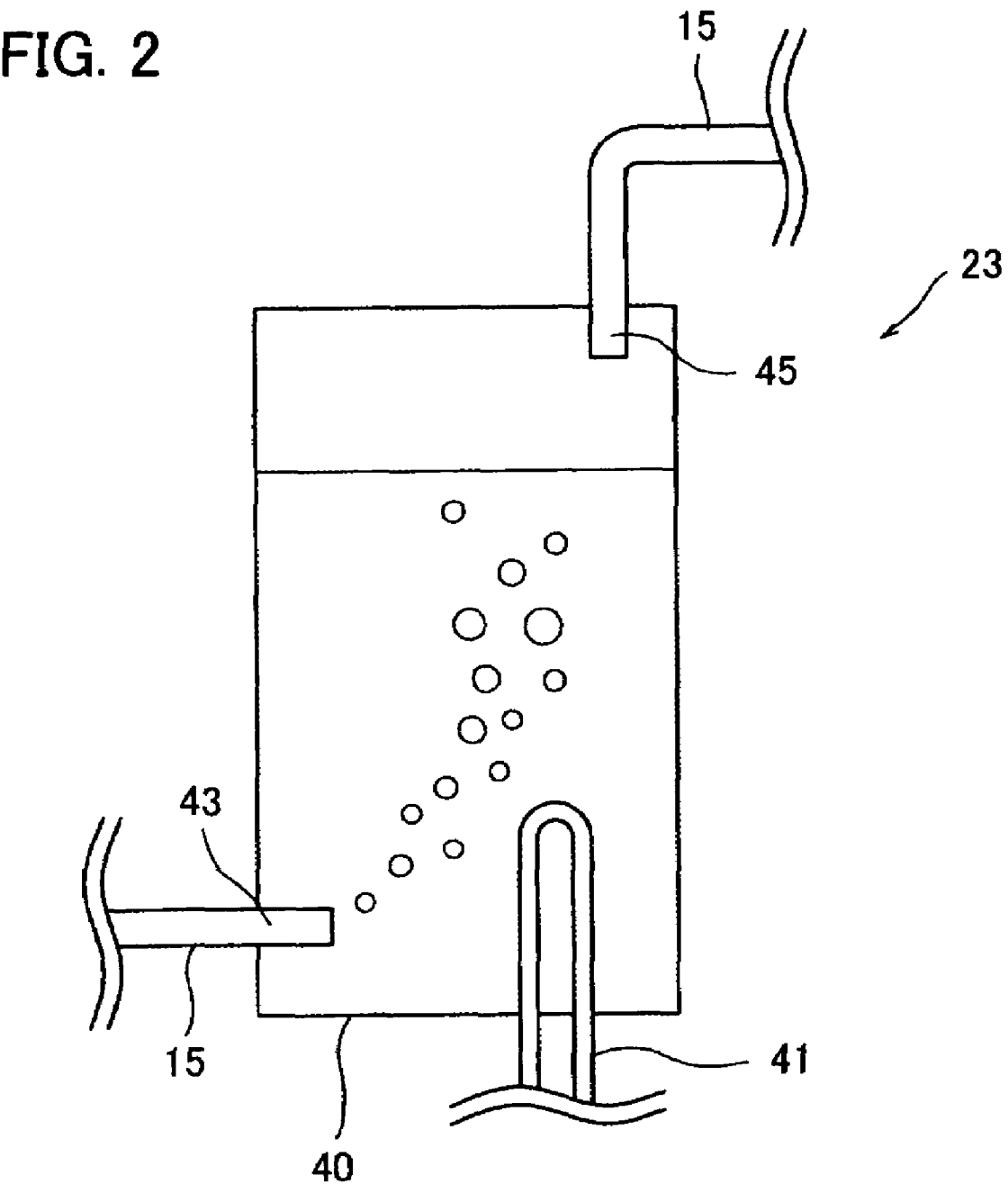
FIG. 2 is a schematic diagram showing a humidifier employed in the fuel-cell evaluation equipment shown in FIG. 1.

Referring to FIG. 2, the humidifier 23 is provided with a reservoir 40 hermetically sealed for storing water and a heater 41 for heating the water in the reservoir 40. Generally, pure water is employed as the water stored in the reservoir 40, but other waters may be employed depending on test conditions and the like. The reservoir 40 has at its lower side a gas inlet 43 for introducing gas flowing in the second passageway 15 after passing through the flow rate adjuster 22 into the stored water in the reservoir 40. The reservoir 40 has at its upper side a gas outlet 45 for discharging the gas introduced into the stored water out to the downstream of the humidifier 23. The gas flowing in the second passageway 15 after passing though the flow rate adjuster 22 is introduced into stored water heated at a predetermined temperature by the heater 41, then being treated with so-called bubbling. The gas introduced into the reservoir 40 is humidified at a predetermined humidity so as to be discharged from the gas outlet 45. Feedback control is made on output of the heater 41 based on dew point (humidity) measured by a dew point meter 46 (see FIG. 1) disposed at the downstream of the gas outlet 45.

Referring to FIG. 1, the first passageway 13 and the second passageway 15 merge at a merging point 47 formed at the downstream of the heater 21 and the humidifier 23. Gas at low humidity (hereinafter referred to as low-humidity gas if needed) having passed through the first passageway 13 and gas at high humidity (hereinafter referred to as high-humidity gas if needed) having passed through the second passageway 15 are mixed at the merging point 47, so that the mixed gas is delivered towards the downstream (the fuel cell 10 side) with the temperature and humidity of the gas regulated.

The cooler 27 is located on the cooling passageway 16 disposed at the downstream of the merging point 47. The passageway switches 25 and 26 are disposed at the boundary between the cooling passageway 16 and the bypassing passageway 17 of the cathode gas passageway 11 or the anode gas passageway 12. The passageway switches 25 and 26 each employ a three port connection valve. Both of the passageway switches 25 and 26 become open into either the cooling passageway 16 or the bypassing passageway 17 of the cathode gas passageway 11 (or of the anode gas passageway 12). Thus, when the passage switches 25 and 26 is made open into the cooling passageway 16, gas having passed through the merging point 47 is led to the cooler 27 so as to be cooled. By contraries, when the passage switches 25 and 26 are made to close the cooling passageway 16, gas having passed through the merging point 47 is led towards the fuel cell 10 bypassing the cooler 27.

In the FC evaluation equipment 1, if and when gas flowing in the upstream of the merging point 47 is at high humidity, the gas flows into the cooling passageway 16 and is cooled by the cooler 27, resulting in freezing within the cooling passageway 16 or the cooler 27, with the result of possibly posing a problem for operations of these devices. The FC evaluation equipment 1 builds in an interlock mechanism that prevents the passageway switches 25 and 26 from opening into the cooling passageway 16, that is, prevents gas from flowing into the cooling passageway 16, if required, based on dew point (humidity) of gas passing through the cathode gas passageway 11 or the anode gas passageway 12. More specifically, the FC evaluation equipment 1 makes the passageway switches 25 and 26 not to become open into the cooling passageway 16 in the case that gas flowing into the cooling passageway 16 is supposed to bring about problems for operations of the cooler 27 and the like based on operating conditions such as humidity (dew point) of gas passing through the cathode gas passageway 11 or the anode gas passageway 12 or an operating temperature of the cooler 27.

The cooler 27 is positioned adjacent to and at the upstream of the thermostat 5 in a direction of gas flow so as to prevent low-temperature gas cooled by the cooler 27 from being warmed before being supplied to the fuel cell 10 installed in the thermostat 5. Specifically, in the FC evaluation equipment 1, the cooler 27 is located at a position capable of shortening to a minimum a duct as shown in heavy line A in FIG. 1, that is, a duct led from the exit side of the cooler 27 through the passage switch 26 to a second temperature regulator 50 (heat exchanger) in the thermostat 5 described below. More specifically, in the case that the cathode and anode gas passageways 11 and 12 each employ a duct of 12.7 mm (½ inch) in diameter and that gas flow is variable in rate in a range 0.5 L/m-240 L/m, the duct A is preferably 50 cm or less in length, and more preferably 30 cm or less.

Portions of the cathode and anode gas passageways 11 and 12 at the downstream of the passageway switches 25 and 26 are drawn into the thermostat 5, and then connected to the second temperature regulators 50 and 50. Each of the second temperature regulators 50 and 50 is provided with a heater and a conventional heat exchanger such as a coil heat exchanger, a so-called tubular heat exchanger having a plurality of heat receiving tubes connected to a header, and a so-called plate-fin heat exchanger. The second temperature regulator 50, which is located adjacent to and at the upstream of the fuel cell 10 in a direction of gas flow, exchanges heat of gas flowing therein under an atmospheric temperature within a thermostatic chamber 60 and finely regulates temperature of gas supplied to the fuel cell 10 by operating the above-mentioned heater, if required.

The thermostat 5 has the thermostatic chamber 60 and regulates atmosphere within the thermostatic chamber 60 into a predetermined temperature, as well as conventional thermostats. The thermostatic chamber 60 has space for accommodation of the fuel cell 10 to be evaluated and the second temperature regulators 50 and 50.

Now, operations of the FC evaluation equipment 1 in the present embodiment are described in detail below. The FC evaluation equipment 1 is provided with a controller 70 whereby an operation of each part is controlled. The controller 70 controls operations of parts such as the regulators 3 and 3 and the thermostat 5 based on signals by meters such as dew point meters or temperature sensors disposed at various parts of the FC evaluation equipment 1.

Before starting an evaluation of the fuel cell 10, the controller 70 starts up the thermostat 5 so as to control an inner atmospheric temperature in the thermostatic chamber 60, that is, an atmospheric temperature in which the fuel cell 10 is installed. The controller 70 also controls operations of the regulators 3 and 3 and the second temperature regulators 50 and 50 based on conditions such as a preset temperature, humidity (dew point), and flow rate of the cathode gas and the anode gas preset according to a test condition of the fuel cell 10.

Specifically, the FC evaluation equipment 1 controls the temperature and humidity of the cathode and anode gas supplied to the fuel cell 10. The FC evaluation equipment 1 supplies to the fuel cell 10 the gas in a state heated at a higher temperature than that of gas supplied from the supply sources 28 and 29, and as well supplies to the fuel cell 10 the gas in a state cooled at a lower temperature than that of gas supplied from the supply sources 28 and 29. More specifically, the FC evaluation equipment 1 performs tests not only in a high-temperature test mode carried out by supplying gas heated up to and over a supply temperature K of gas supplied from the supply sources 28 and 29 to the fuel cell 10, but also in a low-temperature test mode carried out by supplying gas cooled below the supply temperature K to the fuel cell 10. Consequently, the FC evaluation equipment 1 in the present embodiment performs an operation test of the fuel cell 10 in a range from −30° C. to 120° C.

When the FC evaluation equipment 1 operates in the high-temperature mode, the controller 70 determines temperature and flow rate of cathode gas at low humidity (hereinafter referred to as low-humidity cathode gas if needed) supplied through the first passageway (low-humidity passageway) 13 of the cathode gas passageway 11 and cathode gas at high humidity (hereinafter referred to as high-humidity cathode gas if needed) supplied through the second passageway (high-humidity passageway) 15 of the cathode gas passageway 11, based on temperature and humidity of cathode gas to be supplied to the fuel cell 10. Similarly, the controller 70 controls temperature and flow rate of anode gas at low humidity (hereinafter referred to as low-humidity anode gas if needed) supplied through the first passageway 13 of the anode gas passageway 12 and anode gas at high humidity (hereinafter referred to as high-humidity anode gas if needed) supplied through the second passageway 15 of the anode gas passageway 12, based on temperature and humidity of anode gas to be supplied to the fuel cell 10. The controller 70 controls the flow rate adjusters 20 and 22, output of the heater 21, output of the heater 41 of the humidifier 23, and the like of each of the regulators 3 and 3 disposed at the cathode and anode gas passageways 11 and 12, in order to control flow rate or humidity of the high-humidity cathode gas, low-humidity cathode gas, high-humidity anode gas, and low-humidity anode gas. On the basis of the result obtained herein, the controller 70 controls the flow rate adjusters 20 and 22, outputs of the heater 21 and the heater 41 of the humidifier 23, and the like. Low-humidity cathode gas and high-humidity cathode gas respectively generated in the first passageway 13 and the second passageway 15 merge at the merging point 47, thereby generating cathode gas at a predetermined temperature and humidity. Anode gas at a predetermined temperature and humidity is also generated in similar manner with the cathode gas, as is understandable by description above.

When the FC evaluation equipment 1 operates in the high-temperature test mode, the cooler 27 basically does not operate. Therefore, in the high-temperature test mode, both of the passageway switches 25 and 26 are made to close the cooling passageway 16, so that the cathode or anode gas flows into the second temperature regulator 50 bypassing the cooler 27.

Herein, if and when cathode or anode gas having flown into the second temperature regulator 50 is at substantially same temperature as a predetermined temperature, that is, at a temperature enough to be supplied to the fuel cell 10 without any modification, the controller 70 finely controls the temperature of the gas without starting up the heater of the second temperature regulator 50. Specifically, the second temperature regulator 50 is located in the thermostatic chamber 60, thereby exchanging heat of gas approaching just before the fuel cell 10 under an atmospheric temperature within the thermostatic chamber 60 by means of the heat exchanger incorporated in the second temperature regulator 50. Consequently, the cathode or anode gas is supplied to the fuel cell 10 in a state that the temperature is finely regulated by passing though the second temperature regulator 50.

On the other hand, if and when cathode or anode gas having flown into the second temperature regulator 50 is below a temperature to be supplied to the fuel cell 10, it is necessary to heat the cathode or anode gas before supplying to the fuel cell 10. Herein, the FC evaluation equipment 1 controls flow rate of the cathode or anode gas supplied to the fuel cell 10 in a wide range. Specifically, the FC evaluation equipment 1 in the present embodiment controls flow rate of cathode or anode gas supplied to the fuel cell 10 in a range 0.5 L/m-200 L/m. The controller 70 controls power supply to the heaters incorporated in the second temperature regulators 50 in response to flow rates of cathode and anode gases supplied to the fuel cell 10.

More specifically, if and when flow rate of cathode or anode gas is controlled to a very small amount equivalent to 0.5 L/m, the cathode or anode gas flows in the second temperature regulator 50 at a speed of near-stopping condition. Thus, the controller 70 does not operate the heater of the second temperature regulator 50 when a temperature of the cathode or anode gas introduced into the second temperature regulator 50 is not far from a preset temperature, but in a range capable of heating up to the preset temperature by heat exchange with an inner atmosphere in the thermostatic chamber 60 during passing through the second temperature regulator 50.

By contraries, if and when flow rate of cathode or anode gas is in a small amount and difference between the preset temperature and a temperature of the cathode or anode gas introduced into the second temperature regulator 50 is relatively large, the controller 70 operates the heater of the second temperature regulator 50 so as to heat up the gas to the preset temperature. If and when flow rate of cathode or anode gas is controlled to a large amount equivalent to 200 L/m, the cathode or anode gas flows in the second temperature regulator 50 at a high speed, resulting in an insufficient heat exchange with an inner atmosphere in the thermostatic chamber 60. Thus, the controller 70 operates the heater of the second temperature regulator 50, so as to heat the cathode or anode gas flowing in the second temperature regulator 50. The cathode or anode gas is supplied to the fuel cell 10 after temperature of the gas is regulated to a predetermined temperature by means of the second temperature regulator 50.

When the FC evaluation equipment 1 operates in the low-temperature mode, the controller 70 starts up the cooler 27 to cool cathode or anode gas to a predetermined temperature and then supplies the gas to the fuel cell 10. More specifically, when the FC evaluation equipment 1 operates in the low-temperature mode, supply of humidified cathode or anode gas to the cooler 27 may bring about a problem such as damage of the cooler 27 and the like. In the low-temperature mode of the FC evaluation equipment 1, therefore, the controller 70 brings the heater 21 and the humidifier 23 to a halt and makes the flow rate adjuster 22 at the second passageway 15 to be closed. Then, the flow rate adjuster 20 at the first passageway 13 is controlled according to flow rate of the cathode or anode gas to be supplied to the fuel cell 10. Thereby, the cathode or anode gas in a predetermined flow rate is supplied from the cathode gas supply source 28 or the anode gas supply source 29 through the first passageway 13 to the cathode gas passageway 11 or the anode gas passageway 12, respectively.

The passageway switches 25 and 26 in each of the cathode and anode gas passageways 11 and 12 are regulated so as to be made open into the cooling passageway 16. Thereby, each of the cathode and anode gas having flown into the cathode or anode gas passageway 11 or 12 flows in the cooling passageway 16 to be cooled by the cooler 27 to a predetermined temperature. Each of the cathode and anode gas cooled by the cooler 27 is introduced into the second temperature regulator 50 disposed in the thermostatic chamber 60 of the thermostat 5 located adjacent to the cooler 27. Each of the cathode and anode gas introduced into the second temperature regulator 50 is finely regulated to a predetermined temperature by heat exchange in the thermostatic chamber 60, whereupon the gas is supplied to the fuel cell 10.

As described above, the FC evaluation equipment 1 evaluates the performance of the fuel cell 10 installed in the thermostatic chamber 60, so as to precisely regulate an installation condition of the fuel cell 10.

As described above, the FC evaluation equipment 1 has such a structure that cathode gas or anode gas passes through the second temperature regulators 50 disposed in the thermostatic chamber 60 before being supplied to the fuel cell 10. Thereby, if and when the gas to be supplied to the fuel cell 10 in a large rate and regulated in temperature by the regulator 3 is introduced into the second temperature regulator 50 maintaining its temperature with little change, the gas is supplied to the fuel cell 10 with finely regulated by heat exchange at the second temperature regulator 50. By contraries, according to the FC evaluation equipment 1, even if and when the gas supplied to the fuel cell 10 is in a small amount and slow in flowing, the gas is supplied to the fuel cell 10 after being regulated to a test temperature of the fuel cell 10, that is, a temperature within the thermostatic chamber 60, by heat exchange at the second temperature regulator 50. According to the FC evaluation equipment 1, even if a temperature of gas is below a predetermined temperature when introduced in the second temperature regulator 50, the gas is supplied to the fuel cell with regulated into a predetermined temperature by operations of the heater of the second temperature regulator 50. Consequently, according to the FC evaluation equipment 1, gas at a suitable temperature for an evaluation of the fuel cell 10 is supplied to the fuel cell 10, regardless of the flow rate of gas supply to the fuel cell 10.

Further, the FC evaluation equipment 1 in the present embodiment has the cooler 27 positioned on each of the cathode and anode gas passageways 11 and 12 of the gas passageway 2, so as to evaluate an operation of the fuel cell 10 placed under low temperature condition such as in cold climates. Still further, the FC evaluation equipment 1 has the cooler 27 positioned just before thermostat 5, so as to supply gas cooled to a predetermined temperature to the fuel cell 10 with certainty.

Building in an interlock mechanism, the FC evaluation equipment 1 operates the passageway switches 25 and 26 so as to prevent gas flowing towards the cooler 27 in a state capable of cooling to a lower temperature than dew point of gas flowing in each of the cathode and anode gas passageways 11 and 12 of the gas passageway 2. Therefore, the FC evaluation equipment 1 has no unexpected failure involving freezing of water contained in gas.

The FC evaluation equipment 1 in the above-mentioned embodiment has such a structure that cathode gas or anode gas is respectively supplied from the cathode gas supply source 28 or the anode gas supply source 29, but the present invention is not limited thereto, and may have such a structure as being separately provided with a mixer adapted to mix gas such as hydrogen or oxygen that is used as an active material of the fuel cell 10 with inactive gas such as nitrogen gas or argon gas at a predetermined mixing ratio, or supplying a gas mixture whose mixing ratio is regulated in advance.

The FC evaluation equipment 1 in the present embodiment is suitably applicable for an evaluation of a polymer electrolyte fuel cell (PEFC), but the present invention is not limited thereto, and may be suitably applicable for evaluations of so-called low temperature fuel cells such as alkaline fuel cells (AFC) and phosphoric acid fuel cells (PAFC) by controlling means such as the heater 21, the humidifier 23, or the cooler 27 so as to perform heating, humidifying, cooling, or the like of gas according to evaluation conditions.

The above-mentioned embodiment exemplifies such a structure that the cooler 27 is located adjacent to the thermostat 5 so as to prevent making a difference between a predetermined temperature and a temperature of gas supply to the fuel cell 10 resulting from temperature rising of gas cooled by the cooler 27. However, if substantially no difference as described above may be made, it is possible to locate the cooler 27 at the upstream of the humidifier 23, for example. According to this structure, there is no need to build in the interlock mechanism described above, so as to more simplify fluidic components of the gas passageway 2.

As described above, each of the second temperature regulators 50 and 50 is provided with the heater in addition to the heat exchanger adapted to exchange heat of gas flowing therein under an atmospheric temperature within the thermostatic chamber 60, but the present invention is not limited thereto, and may dispense with the heater. This structure more simplifies equipment components of the FC evaluation equipment 1.

Further, the FC evaluation equipment 1 described above is provided with the heater 21 on the first passageway 13, thereby rising temperature of gas flowing in the first passageway 13 up to or over a dew point temperature of gas flowing in the second passageway 15. Consequently, the FC evaluation equipment 1 prevents the formation of any dew condensation even though low-humidity gas flowing in the first passageway 13 is mixed with high-humidity gas flowing in the second passageway 15.

The invention claimed is:

1. A fuel-cell evaluation equipment comprising:
   a gas passageway for supplying gas to a fuel cell; and
   a thermostat adapted to accommodate at least a part of the fuel cell,
   wherein the gas passageway comprises a first temperature regulator adapted to regulate the temperature of the gas, a humidity regulator adapted to regulate the humidity of the gas, and a second temperature regulator, and
   wherein the thermostat comprises a thermostatic chamber adapted to regulate the atmospheric temperature in the chamber into a predetermined condition,
   the second temperature regulator being provided with a heat exchanger located in the thermostatic chamber,
   wherein gas is regulated to a predetermined temperature and humidity by the first temperature regulator and humidity regulator and thereafter introduced into the heat exchanger in the thermostatic chamber so as to exchange heat with the thermostatic chamber.

2. The fuel-cell evaluation equipment as defined in claim 1, wherein the gas passageway further comprises a first passageway for guiding low-humidity gas and a second passageway for guiding gas with higher humidity than that of the gas flowing in the first passageway,
   the first and second passageways merging at a merging point,
   wherein the gas passageway is adapted to be connected to the fuel cell at downstream of the merging point in a direction of gas flowing, and
   wherein the humidity regulator is adapted to regulate the humidity of gas to be supplied to the fuel cell by adjusting a flow ratio of gas flowing in the first passageway to gas flowing in the second passageway.

3. The fuel-cell evaluation equipment as defined in claim 1, wherein the first temperature regulator is provided with a cooler adapted to cool gas to be supplied to a fuel cell.

4. The fuel-cell evaluation equipment as defined in claim 1, wherein the first temperature regulator is provided with a cooler adapted to cool gas to be supplied to a fuel cell,
   the cooler being located just before the thermostat in a direction of gas flowing.

5. The fuel-cell evaluation equipment as defined in claim 1, wherein the first temperature regulator is provided with a cooler adapted to cool gas to be supplied to a fuel cell,
   the cooler being located downstream of the humidity regulator in a direction of gas flowing,
   wherein the gas passageway further comprises a cooling passageway for passing the gas therethrough to the cooler and a bypass passageway for bypassing the cooling passageway, and
   further comprising a passageway switch at the boundary between the cooling passageway and the bypass passageway,
   the passageway switch becoming unswitchable to the cooling passageway when the cooler operates in a state capable of cooling gas flowing in the upstream of the passageway switch to a lower temperature than a dew-point temperature of the gas.

6. The fuel-cell evaluation equipment as defined in claim 1, wherein the second temperature regulator is provided with a heater adapted to heat gas,
   the heater of the second temperature regulator being deactivated when the following conditions are satisfied:
   (a) that a gas-flowing temperature of gas flowing into the second temperature regulator is lower than a preset temperature determined according to a test condition of a fuel cell,
   (b) that the difference between the gas-flowing temperature and the preset temperature is within a range capable of heating the gas to the preset temperature by heat exchange at the heat exchanger in the second temperature regulator in the thermostatic chamber, and
   (c) that gas flow into the second temperature regulator is less than a predetermined amount.

7. The fuel-cell evaluation equipment as defined in claim 1, wherein the gas passageway further comprises a first passageway for guiding low-humidity gas and a second passageway for guiding gas with higher humidity than that of the gas flowing in the first passageway,
the first and second passageways merging at a merging point,
wherein the first temperature regulator is provided with a heater adapted to heat gas to be supplied to a fuel cell,
wherein the gas passageway is adapted to be connected to the fuel cell at downstream of the merging point in a direction of gas flowing, and
wherein the heater of the first temperature regulator is located on the first passageway.

8. The fuel-cell evaluation equipment as defined in claim 7, wherein the humidity regulator is adapted to regulate the humidity of gas to be supplied to the fuel cell by adjusting a flow ratio of gas flowing in the first passageway to gas flowing in the second passageway.

9. The fuel-cell evaluation equipment as defined in claim 7, wherein the first temperature regulator is provided with a cooler adapted to cool gas to be supplied to a fuel cell, the cooler being located just before the thermostat in a direction of gas flowing.

10. The fuel-cell evaluation equipment as defined in claim 7,
wherein the first temperature regulator is provided with a cooler adapted to cool gas to be supplied to a fuel cell,
the cooler being located downstream of the humidity regulator in a direction of gas flowing,
wherein the gas passageway further comprises a cooling passageway for passing the gas therethrough to the cooler and a bypass passageway adapted to bypass the cooling passageway, and
further comprising a passageway switch at the boundary between the cooling passageway and the bypass passageway,
the passageway switch becoming unswitchable to the cooling passageway when the cooler operates in a state capable of cooling gas flowing in the upstream of the passageway switch to a lower temperature than a dew-point temperature of the gas.

11. A fuel-cell evaluation equipment comprising:
a gas passageway for supplying gas to a fuel cell; and
a thermostat adapted to accommodate at least a part of the fuel cell,
wherein the gas passageway comprises a first temperature regulator adapted to regulate the temperature of the gas, a humidity regulator adapted to regulate the humidity of the gas, and a second temperature regulator,
the first temperature regulator being provided with a heater adapted to heat gas and a cooler adapted to cool gas, and
wherein the thermostat comprises a thermostatic chamber adapted to regulate the atmospheric temperature in the chamber into a predetermined condition,
the second temperature regulator being provided with a heat exchanger located in the thermostatic chamber;
wherein gas is regulated to a predetermined temperature and humidity by the first temperature regulator and humidity regulator and thereafter introduced into the heat exchanger in the thermostatic chamber so as to exchange heat with the thermostatic chamber.

12. The fuel-cell evaluation equipment as defined in claim 11,
wherein the gas passageway further comprises a first passageway for guiding low-humidity gas and a second passageway for guiding gas with higher humidity than that of the gas flowing in the first passageway,
the first and second passageways merging at a merging point, and
wherein the gas passageway is adapted to be connected to the fuel cell at downstream of the merging point in a direction of gas flowing, and
wherein the humidity regulator is adapted to regulate the humidity of gas to be supplied to the fuel cell by adjusting a flow ratio of gas flowing in the first passageway to gas flowing in the second passageway.

13. The fuel-cell evaluation equipment as defined in claim 11,
the cooler being located just before the thermostat in a direction of gas flowing.

14. The fuel-cell evaluation equipment as defined in claim 11,
the cooler being located downstream of the humidity regulator in a direction of gas flowing,
wherein the gas passageway further comprises a cooling passageway for passing the gas therethrough to the cooler and a bypass passageway for bypassing the cooling passageway, and
further comprising a passageway switch at the boundary between the cooling passageway and the bypass passageway,
the passageway switch becoming unswitchable to the cooling passageway when the cooler operates in a state capable of cooling gas flowing in the upstream of the passageway switch to a lower temperature than a dew-point temperature of the gas.

15. The fuel-cell evaluation equipment as defined in claim 11,
wherein the gas passageway further comprises a first passageway for guiding low-humidity gas and a second passageway for guiding gas with higher humidity than that of the gas flowing in the first passageway,
the first and second passageways merging at a merging point,
wherein the gas passageway is adapted to be connected to the fuel cell at downstream of the merging point in a direction of gas flowing, and
the heater of the first temperature regulator being located on the first passageway.

16. The fuel-cell evaluation equipment as defined in claim 11,
wherein the second temperature regulator is provided with a heater adapted to heat gas,
the heater of the second temperature regulator being deactivated when the following conditions are satisfied:
(a) that a gas-flowing temperature of gas flowing into the second temperature regulator is lower than a preset temperature determined according to a test condition of a fuel cell,
(b) that the difference between the gas-flowing temperature and the preset temperature is within a range capable of heating the gas to the preset temperature by heat exchange at the heat exchanger in the second temperature regulator in the thermostatic chamber, and
(c) that gas flow into the second temperature regulator is less than a predetermined amount.

17. A fuel-cell evaluation equipment comprising:
a gas passageway for supplying gas to a fuel cell; and
a thermostat adapted to accommodate at least a part of the fuel cell,
wherein the gas passageway comprises a first temperature regulator adapted to regulate the temperature of the gas, a humidity regulator adapted to regulate the humidity of the gas, and a second temperature regulator, and wherein the thermostat comprises a thermostatic chamber adapted to regulate the atmospheric temperature within the chamber into a predetermined condition, and wherein the second temperature regulator is provided with a heat exchanger and a heater, at least the heat exchanger being located in the thermostatic chamber, the heater of the second temperature regulator being deactivated when the following conditions are satisfied:

(a) that a gas-flowing temperature of gas flowing into the second temperature regulator is lower than a preset temperature determined according to a test condition of a fuel cell, (b) that the difference between the gas-flowing temperature and the preset temperature is within a range capable of heating the gas to the preset temperature by heat exchange at the heat exchanger in the second temperature regulator in the thermostatic chamber, and (c) that gas flow into the second temperature regulator is less than a predetermined amount.

18. The fuel-cell evaluation equipment as defined in claim 17, wherein the gas passageway further comprises a first passageway for guiding low-humidity gas and a second passageway for guiding gas with higher humidity than that of the gas flowing in the first passageway, the first and second passageways merging at a merging point, wherein the gas passageway is adapted to be connected to the fuel cell at downstream of the merging point in a direction of gas flowing, and wherein the humidity regulator is adapted to regulate the humidity of gas to be supplied to the fuel cell by adjusting a flow ratio of gas flowing in the first passageway to gas flowing in the second passageway.

19. The fuel-cell evaluation equipment as defined in claim 17, wherein the first temperature regulator is provided with a cooler adapted to cool gas to be supplied to a fuel cell.

20. The fuel-cell evaluation equipment as defined in claim 17, wherein the first temperature regulator is provided with a cooler adapted to cool gas to be supplied to a fuel cell, the cooler being located just before the thermostat in a direction of gas flowing.

21. The fuel-cell evaluation equipment as defined in claim 17, wherein the first temperature regulator is provided with a cooler adapted to cool gas to be supplied to a fuel cell, the cooler being located downstream of the humidity regulator in a direction of gas flowing, wherein the gas passageway further comprises a cooling passageway for passing the gas therethrough to the cooler and a bypass passageway for bypassing the cooling passageway, and further comprising a passageway switch at the boundary between the cooling passageway and the bypass passageway, the passageway switch becoming unswitchable to the cooling passageway when the cooler operates in a state capable of cooling gas flowing in the upstream of the passageway switch to a lower temperature than a dew-point temperature of the gas.

22. The fuel-cell evaluation equipment as defined in claim 17, wherein the gas passageway further comprises a first passageway for guiding low-humidity gas and a second passageway for guiding gas with higher humidity than that of the gas flowing in the first passageway, the first and second passageways merging at a merging point, wherein the gas passageway is adapted to be connected to the fuel cell at downstream of the merging point in a direction of gas flowing, and wherein the first temperature regulator is provided with a heater adapted to heat gas to be supplied to a fuel cell, the heater of the first temperature regulator being located on the first passageway.

* * * * *